(12) United States Patent
Prince et al.

(10) Patent No.: US 10,664,320 B2
(45) Date of Patent: May 26, 2020

(54) HOST SPECIFIC CONTAINERIZED APPLICATION CONFIGURATION GENERATION

(71) Applicant: Red Hat, Inc., Raleigh, NC (US)

(72) Inventors: Paul Daniel Prince, Blacksburg, VA (US); Martin Nicolas Andre, Strasbourg (FR); Flavio Percoco, Lake Como (IT); Ian Main, Salmo (CA)

(73) Assignee: Red Hat, Inc., Raleigh, NC (US)

(*) Notice: Subject to any disclaimer, the term of this patent is extended or adjusted under 35 U.S.C. 154(b) by 267 days.

(21) Appl. No.: 15/668,348

(22) Filed: Aug. 3, 2017

(65) Prior Publication Data

US 2019/0042320 A1 Feb. 7, 2019

(51) Int. Cl.
| | |
|---|---|
| *H04L 29/08* | (2006.01) |
| *G06F 9/50* | (2006.01) |
| *H04L 12/24* | (2006.01) |
| *G06F 8/71* | (2018.01) |
| *G06F 9/445* | (2018.01) |
| *G06F 8/61* | (2018.01) |
| *G06F 8/30* | (2018.01) |

(52) U.S. Cl.
CPC .............. *G06F 9/5077* (2013.01); *G06F 8/71* (2013.01); *G06F 9/44505* (2013.01); *H04L 41/5096* (2013.01); *G06F 8/30* (2013.01); *G06F 8/61* (2013.01); *G06F 8/63* (2013.01)

(58) Field of Classification Search
CPC ...... G06F 9/5077; G06F 8/71; G06F 9/44505; G06F 8/30; G06F 8/61; G06F 8/63; H04L 41/5096
See application file for complete search history.

(56) References Cited

U.S. PATENT DOCUMENTS

2007/0233698 A1* 10/2007 Sundar ...................... G06F 8/60
2014/0007092 A1* 1/2014 Barbee .................. G06F 9/4856
718/1

(Continued)

OTHER PUBLICATIONS

Dockerising Puppet; (http://blog.manageacloud.com) 2014 (17 pages).

(Continued)

*Primary Examiner* — Chris Parry
*Assistant Examiner* — Stephen J Houlihan
(74) *Attorney, Agent, or Firm* — K&L Gates LLP

(57) ABSTRACT

Host specific containerized application configuration generation is disclosed. For example, first and second image files are stored on a first memory. Second and third memories are associated with a first host node. A request to generate a first configuration file associated with a plurality of isolated guests is received, launching a first short-lived guest of the plurality of isolated guests on the second memory. A configuration management application executes on the first short-lived guest, generating and saving the first configuration file to the third memory. The first short-lived guest is terminated. A first service guest of the plurality of isolated guests is launched on the second memory. A first service configured with the first configuration file executes on the first service guest. A second service guest of the plurality of isolated guests is launched on the second memory executing a second service configured with the first configuration file.

16 Claims, 11 Drawing Sheets

(56) References Cited

U.S. PATENT DOCUMENTS

| | | | | |
|---|---|---|---|---|
| 2015/0334696 A1* | 11/2015 | Gu | ................... | H04L 67/1095 |
| | | | | 718/1 |
| 2016/0205518 A1* | 7/2016 | Patel | ................ | H04L 67/1002 |
| | | | | 455/518 |
| 2016/0350081 A1 | 12/2016 | Kumar et al. | | |
| 2017/0034023 A1 | 2/2017 | Nickolov et al. | | |
| 2017/0104641 A1* | 4/2017 | Bradshaw | ........... | H04L 67/2833 |
| 2018/0365076 A1* | 12/2018 | Liu | ................... | G06F 9/45558 |

OTHER PUBLICATIONS

Language: Tags—Documentation—Puppet; https://docs.puppet.com/puppet/2.7/lang_tags.html (pp. 1-4) (retrieved on May 19, 2017).

Configuration Reference—Documentation—Puppet; https://docs.puppet.com/puppet/3.5/configuration.html (pp. 1-31); (retrieved on May 19, 2017).

GitHub—puppetlabs/puppetlabs-image_build: Build Docker images from Puppet code; https://github.com/puppetlabls/puppetlabs-image_build; 2017 (pp. 1-7).

Docker Install Via Puppet; http://www.bogotobogo.com/DevOps/Docker/Docker_puppet.php; 2016 (pp. 1-34).

Puppet-Agent Man Page; https://www.mankier.com/8/puppet-agent (pp. 1-19) (retrieved on May 19, 2017).

* cited by examiner

HOST SPECIFIC CONTAINERIZED APPLICATION CONFIGURATION GENERATION

BACKGROUND

The present disclosure generally relates to generating configuration files for applications executing in containers on distributed hosting platforms, such as multi-tenant clouds. In computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests allow a programmer to quickly scale the deployment of applications to the volume of traffic requesting the applications. Isolated guests may be deployed in a variety of hardware environments. There may be economies of scale in deploying hardware in a large scale. To attempt to maximize the usage of computer hardware through parallel processing using virtualization, it may be advantageous to maximize the density of isolated guests in a given hardware environment, for example, in a multi-tenant cloud. In many cases, containers may be leaner than virtual machines because a container may be operable without a full copy of an independent operating system, and may thus result in higher compute density and more efficient use of physical hardware. Multiple containers may also be clustered together to perform a more complex function than the containers are capable of performing individually. In an example, a container and/or a cluster of containers may be implemented specifically to execute certain specific tasks and/or types of tasks. A scheduler may be implemented to allocate containers and clusters of containers to a host, the host being either a physical host or a virtual host such as a virtual machine. Typically, a container is significantly lighter weight than a virtual machine, and may be hosted in a virtual machine, allowing for additional flexibility and scalability of deployment.

SUMMARY

The present disclosure provides a new and innovative system, methods and apparatus for host specific containerized application configuration generation. In an example, first and second image files are stored on a first memory. Second and third memories are associated with a first host node with one or more processors executing to receive a request to generate a first configuration file that is associated with a plurality of isolated guests. A first short-lived guest of the plurality of isolated guests is launched with the first image file on the second memory on the first host node. A configuration management application executes on the first short-lived guest, generating and saving the first configuration file to the third memory. In response to saving the first configuration file to the third memory, the first short-lived guest is terminated. A first service guest of the plurality of isolated guests is launched with the second image file on the second memory on the first host node. A first service configured with the first configuration file executes on the first service guest. A second service guest of the plurality of isolated guests is launched with the second image file on the second memory on the first host node. A second service configured with the first configuration file executes on the second service guest.

Additional features and advantages of the disclosed method and apparatus are described in, and will be apparent from, the following Detailed Description and the Figures.

DETAILED DESCRIPTION OF EXAMPLE EMBODIMENTS

Figure 1A:
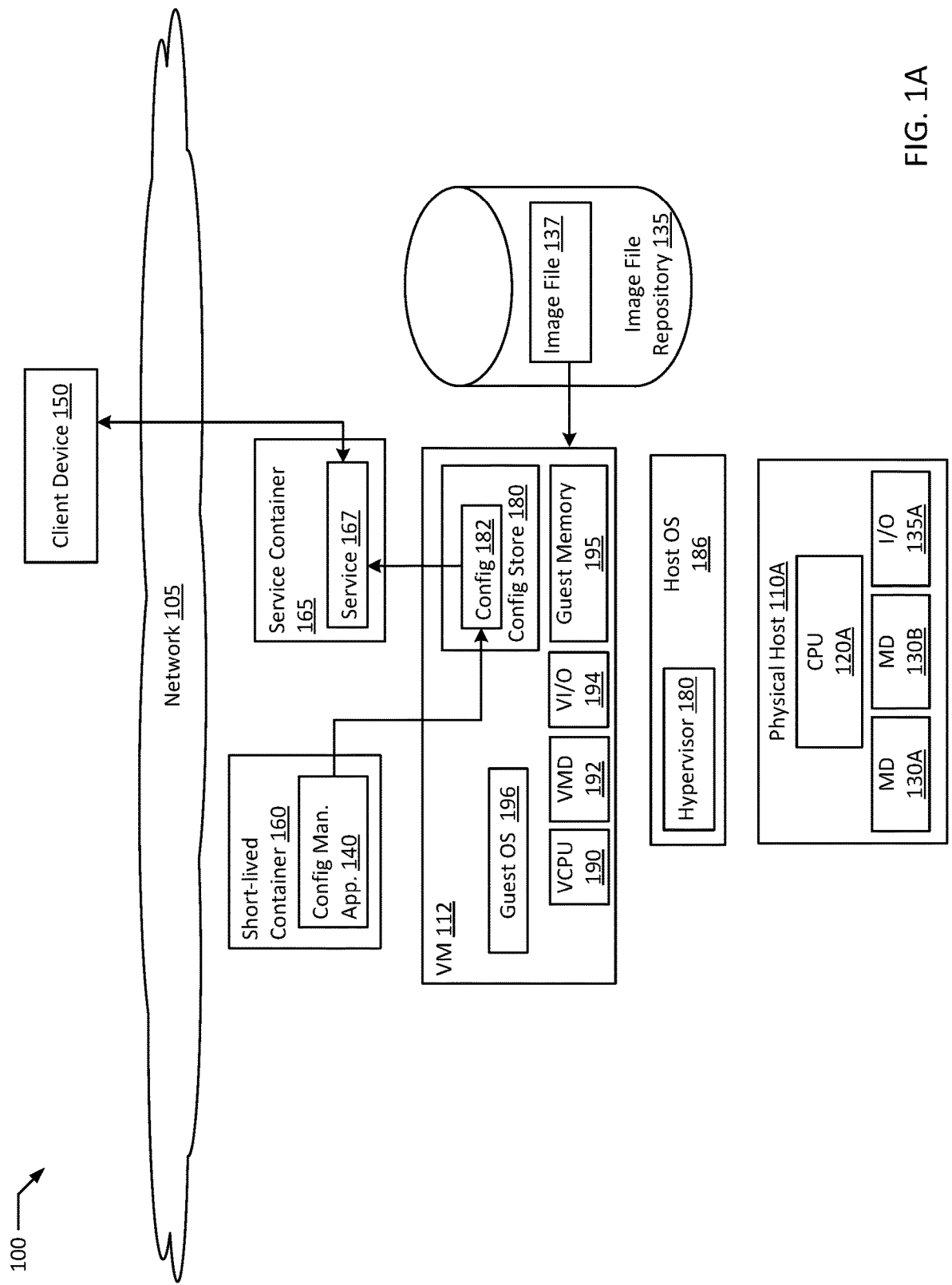
FIG. 1A is a block diagram of a host specific containerized application configuration generation system in a virtualized hosting environment according to an example of the present disclosure.

In computer systems utilizing isolated guests, typically, virtual machines and/or containers are used. In an example, a virtual machine ("VM") may be a robust simulation of an actual physical computer system utilizing a hypervisor (e.g., Red Hat® KVM and Red Hat® KVM hypervisor) to allocate physical resources to the virtual machine. In some examples, a container based virtualization system such as Red Hat® OpenShift® or Docker® may be advantageous as container based virtualization systems may be lighter weight than systems using virtual machines with hypervisors. In the case of containers, oftentimes a container will be hosted on a physical host or virtual machine that already has an operating system ("OS") (e.g., Red Hat Enterprise Linux®) executing, and the container may be hosted on the operating system of the physical host or VM. In large scale implementations, container schedulers, such as those included in container orchestrators (e.g., Kubernetes®), generally respond to frequent container startups and cleanups with low latency. Containers may allow wide spread, parallel deployment of computing power for specific tasks. In a typical example, a container may be instantiated to process a specific task and reaped after the task is complete.

Due to economies of scale, containers often tend to be more advantageous in large scale hardware deployments where the relatively fast ramp-up time of containers allows for more flexibility for many different types of applications to share computing time on the same physical hardware, for example, in a private or multi-tenant cloud environment. In some examples, where containers from a homogenous source are deployed, it may be advantageous to deploy containers directly on physical hosts. In a multi-tenant cloud, it may be advantageous to deploy containers and groups of containers within virtual machines as the hosting service may not typically be able to predict dependencies for the containers such as shared operating systems, and therefore, using virtual machines (e.g., with Red Hat Virtualization®) adds flexibility for deploying containers from a variety of sources on the same physical host. In many examples, containers may be constructed as stand units that don't change while deployed, and therefore executing containers typically require less permissions on the host to execute than VMs. More restricted access to the hosting environment typically improves security by avoiding potential security gaps that may be exploited, both as between different tenants on the same cloud and between tenants and guests accessing services over the internet. In addition, since containers typically do not require capabilities to execute new code or install new software, potential security risks with those types of functionality may be reduced by eliminating support for such tasks. In an example, hosting containers directly on physical servers may yield further efficiencies, but may restrict the containers executing on the physical servers to containers that are compatible with the physical server's host operating system. In comparison, hosting containers inside VMs may enable the hosting of containers with different architectures on the same physical server. In an example, physical and/or virtual host nodes may each host dozens or hundreds of containers, each of which may independently execute tasks.

In many network applications, such as those hosted on containers in multi-tenant clouds, host specific settings may require configuration in order for containerized applications to execute as designed. For example, network security features such as firewalls may require host specific settings for communication flows to and from a server, with specific ports configured to allow such traffic (or disallow traffic as appropriate). In a non-containerized hosting environment, unsecured network facing (e.g., internet facing) applications and services, may typically execute on servers (e.g., physical servers and/or virtual machines) that are built with a configuration management application. When the host is first initialized for the application, the configuration management application (e.g., Puppet®, Chef®, Ansible®, SaltStack®) may execute to generate host specific configurations for a service, then install the service, and start execution of the service with the host specific configurations. Such an installation cycle may typically take up to several minutes as configurations are generated and the service is installed over a network. In a pure physical server deployment, such set up costs may be incurred very rarely (e.g., once per release of the application), and may therefore result in a negligible or minimal amount of net overhead.

However, containers are typically employed to quickly scale up applications to meet spikes in demand for the services they host. Constructing a container to deploy a service with a configuration management application similarly to a deployment on a more permanent host such as a physical server or a VM may defeat a significant part of the advantages in flexible and speedy deployment offered by containers, which may be deployed on a scale of seconds, or fractions of a second, rather than minutes. In addition, having a container install the application after it is launched is both problematic from a security standpoint as well as resource inefficient. Typically, containers are constructed from image files whose operational components are set when the image file is constructed. Therefore, part of a containerized security model may be to restrict access rights to prohibit the installation of new executable code during the execution of a container. In addition, containers are typically leanly constructed and are often constructed without libraries required for installing new executable code. Even in containers configured to allow the configuration management application to execute with all of the permissions and capabilities of a physical server, repeating configuration each time a new container is launched, and potentially also installing the application after launching the container may increase container instantiation latency by orders of magnitude, from seconds to upwards of a minute.

Some work arounds for the above issues that see use in practice exist, but typically have significant drawbacks. For example, configurations may be packaged with the service hosting containers, but then this becomes a maintenance nightmare requiring different image files for each potential host. Another workaround may be to generate configurations and map them manually, at the cost of speedy automated deployment of service containers. Theoretically, custom container specific configuration management applications may be constructed. However, customized solutions typically have backwards compatibility pitfalls, and many enterprise scale deployments rely on hundreds, even thousands of configuration generation scripts built up over years for the applications that may be deployed. In addition, such a custom container specific configuration management application would still incur latency and overhead both to the size of a service container as well as to startup latency. Having a configuration management application start a service may also create contention with container engines (e.g., Docker®) or container orchestrators (e.g., Kubernetes®) used to manage the containerized environment, as the container engine typically manages services in containers.

The present disclosure aims to address the above discussed issues including the latency as well as the backwards compatibility issues presented by containerized applications and services requiring host specific configurations with host specific containerized application configuration generation. In an example, a configuration management application is added to an image file for a container that hosts a service. The container is then configured to be instantiable in a short-lived, ephemeral, transient, sacrificial configuration state, or an execution state for hosting the service. The first time the container is launched on a given host, whether physical or virtual, the container is launched as a short-lived container that executes the configuration management application to generate a configuration for the service. In an example, the configuration management application may have certain functionality that is incompatible with containerized deployment either disabled or removed, for example, through execution permissions, code changes, or configuration settings for the configuration management application. In an example, the configuration is then stored in a location known to and accessible by other copies of the container executing the service on the host. This configuration may then be shared by the numerous copies of the container executing on the host, and since hundreds of containers are typically hosted on a given physical or virtual host node, the initial startup cost is only incurred once, and is therefore minimally impactful. Since the same configuration management application is used as in legacy deployments of the service directly on physical, bare-metal hosts, the configuration generation settings and scripts input into the configuration management application remain backwards compatible, facilitating transition into a containerized application deployment scheme.

FIG. 1A is a block diagram of a host specific containerized application configuration generation system in a virtualized hosting environment according to an example of the present disclosure. The system 100 may include one or more interconnected hosts (e.g., physical host 110A). Physical host 110A may in turn include one or more physical processors (e.g., CPU 120A) communicatively coupled to memory devices (e.g., MD 130A-B) and input/output devices (e.g., I/O 135A). As used herein, physical processor or processors 120A-B refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, a memory device 130A-B refers to a volatile or non-volatile memory device, such as RAM, ROM, EEPROM, or any other device capable of storing data. As discussed herein, I/O device 135A refers to devices capable of providing an interface between one or more processor pins and an external device, the operation of which is based on the processor inputting and/or outputting binary data. CPU 120A may be interconnected with other CPUs using a variety of techniques, ranging from a point-to-point processor interconnect, to a system area network, such as an Ethernet-based network. Local connections within physical host 110A, including the connections between a processor 120A and a memory device 130A-B and between a processor 120A and an I/O device 135A may be provided by one or more local buses of suitable architecture, for example, peripheral component interconnect (PCI).

In an example, physical host 110A may run one or more isolated guests, for example, short-lived container 160, service container 165, and VM 112. In an example, any of short-lived container 160 or service container 165 may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine (e.g., VM 112). In an example, containers that perform a unified function may be grouped together in a container cluster that may be deployed together (e.g., in a Kubernetes® pod). In an example, a given service may require the deployment of multiple containers and/or pods in multiple physical locations. In an example, VM 112 may be a VM executing on physical host 110A. In an example, short-lived container 160 and/or service container 165 may execute on VM 112. In an example, any of short-lived container 160 and/or service container 165 may be executing directly on either of physical host 110A without a virtualized layer in between. In an example, isolated guests may be further nested in other isolated guests. For example, a VM 112 may host containers (e.g., short-lived container 160, service container 165). In addition, containers and/or VMs may further host other guests necessary to execute their configured roles. For example, VM 112 and/or a container (e.g., short-lived container 160, service container 165) may further host a Java® Virtual Machine if execution of Java® code is necessary.

System 100 may run VM 112 by executing a software layer (e.g., hypervisor 180) above the hardware and below VM 112, as schematically shown in FIG. 1A. In an example, the hypervisor 180 may be a component of a host operating system 186 executed by the system 100. In another example, the hypervisor 180 may be provided by an application running on the operating system 186, or may run directly on the physical host 110A without an operating system beneath it. The hypervisor 180 may virtualize the physical layer, including processors, memory, and I/O devices, and present this virtualization to VM 112 as devices, including virtual central processing units ("VCPU") 190, virtual memory devices ("VMD") 192, virtual input/output ("VI/O") devices 194, and/or guest memories (e.g., guest memory 195). In an example, a container may execute directly on host OS 186 without an intervening layer of virtualization.

In an example, a VM 112 may be a virtual machine and may execute a guest operating system 196 which may utilize the underlying VCPU 190, VMD 192, and VI/O 194. One or more isolated guests (e.g., short-lived container 160 or service container 165) may be running on VM 112 under the respective guest operating system 196. Processor virtualization may be implemented by the hypervisor 180 scheduling time slots on one or more physical processors 120A such that from the guest operating system's perspective those time slots are scheduled on a virtual processor 190.

VM 112 may run on any type of dependent, independent, compatible, and/or incompatible applications on the underlying hardware and host operating system 186. In an example, short-lived container 160 and/or service container 165 running on VM 112 may be dependent on the underlying hardware and/or host operating system 186. In another example, short-lived container 160 and/or service container 165 running on VM 112 may be independent of the underlying hardware and/or host operating system 186. In an example, short-lived container 160 and/or service container 165 running on VM 112 may be compatible with the underlying hardware and/or host operating system 186. Additionally, short-lived container 160 and/or service container 165 running on VM 112 may be incompatible with the underlying hardware and/or OS. The hypervisor 180 may manage memory for the host operating system 186 as well as memory allocated to the VM 112 and guest operating system 196 such as guest memory 195 provided to guest OS 196. In an example, configuration store 180 may store host specific configuration files for services executing on VM 112. In an example, configuration store 180 may be stored in VMD 192 and/or guest memory 195, which virtualize the physical storage in memory device s130A-B. In an example, short-lived container 160 may generate configuration 182 stored in configuration store 180 by using configuration management application 140. In the example, configuration 182 may then be used to configure service 167 executing on service container 165 which may in turn be an application accessed by a client device 150.

In an example, network 105 may be any form of suitable network for allowing communications between computing devices, for example, a public network (e.g., the Internet), a private network (e.g., a local area network (LAN) or wide area network (WAN)), or a combination thereof. In an example, client device 150 may be any form of network accessible device (e.g., phone, tablet, laptop, desktop, server, Internet of Things ("IOT") device, etc.).

In an example, image file repository 135 may be any form of suitable storage system for image files for launching isolated guests (e.g., short-lived container 160, service container 165, VM 112), for example a relational database. The image file repository 135 may be stored in a database associated with a database management system ("DBMS"). A DBMS is a software application that facilitates interaction between the database and other components of the system 100. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, a relational database may be implemented with add-on packages and/or services for additional functionality and security (e.g., Red Hat Database®). In an example, image file repository 135 may be stored in a database organized as a formal database with a schema such as a relational schema with defined tables, indices, links, triggers, various commands etc. In some examples, image file repository 135 may not be organized as a formal database, but may instead be an alternative storage structure capable of holding the information stored in ASDBs image file repository 135, including but not limited to a file, folder, directory, registry, array, list, etc.

Figure 1B:
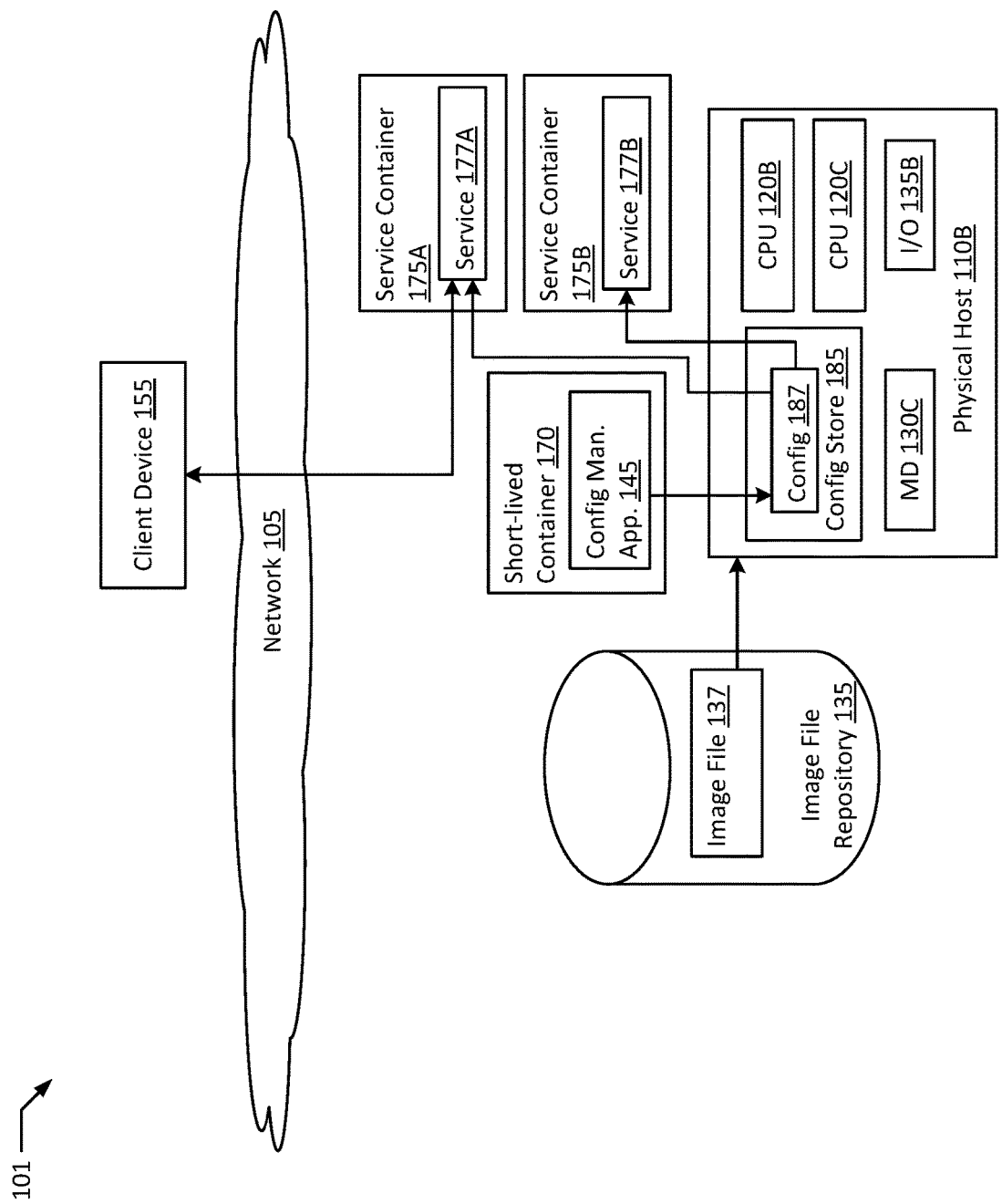
FIG. 1B is a block diagram of a host specific containerized application configuration generation system in a physical hosting environment according to an example of the present disclosure.

FIG. 1B is a block diagram of a host specific containerized application configuration generation system in a physical hosting environment according to an example of the present disclosure. The system 101 may again include one or more interconnected hosts (e.g., physical host 110B). Physical host 110B may in turn include one or more physical processors (e.g., CPU 120B-C) communicatively coupled to memory devices (e.g., MD 130C) and input/output devices (e.g., I/O 135B). In an example, physical host 110B may have similar architecture to physical host 110A, with CPUs 120B-C corresponding to CPU 120A, MD 130C corresponding to MD 130A-B, and I/O 135B corresponding to I/O 135A.

In an example, physical host 110B may also run one or more isolated guests, for example, short-lived container 170 service containers 175A-B. In an example, short-lived container 170 and service containers 175A-B may correspond to short-lived container 160 and service containers 165, performing similar tasks. In an example, short-lived container 170 and service containers 177A-B are hosted directly on physical host 110B, for example, on a host operating system of physical host 110B. In an example, physical host 110B is in communication with image file repository 135 similar to physical host 110A. In an example, short-lived container 170 and service containers 177A-B may be instantiated from the same image file 137 as short-lived container 160 and service containers 165. In an example, client device 155 is a client device similar to client device 150. In example system 101, configuration management application 145 executing in short-lived container 170 may generate configuration 187 stored in configuration store 185, which may in turn be located in memory device 130C. In an example, service 177A and service 177B executing on respective service containers 175A and 175B may both be configured with configuration 187. In an example, service 177A executes to provide content to client device 155.

Figure 2:
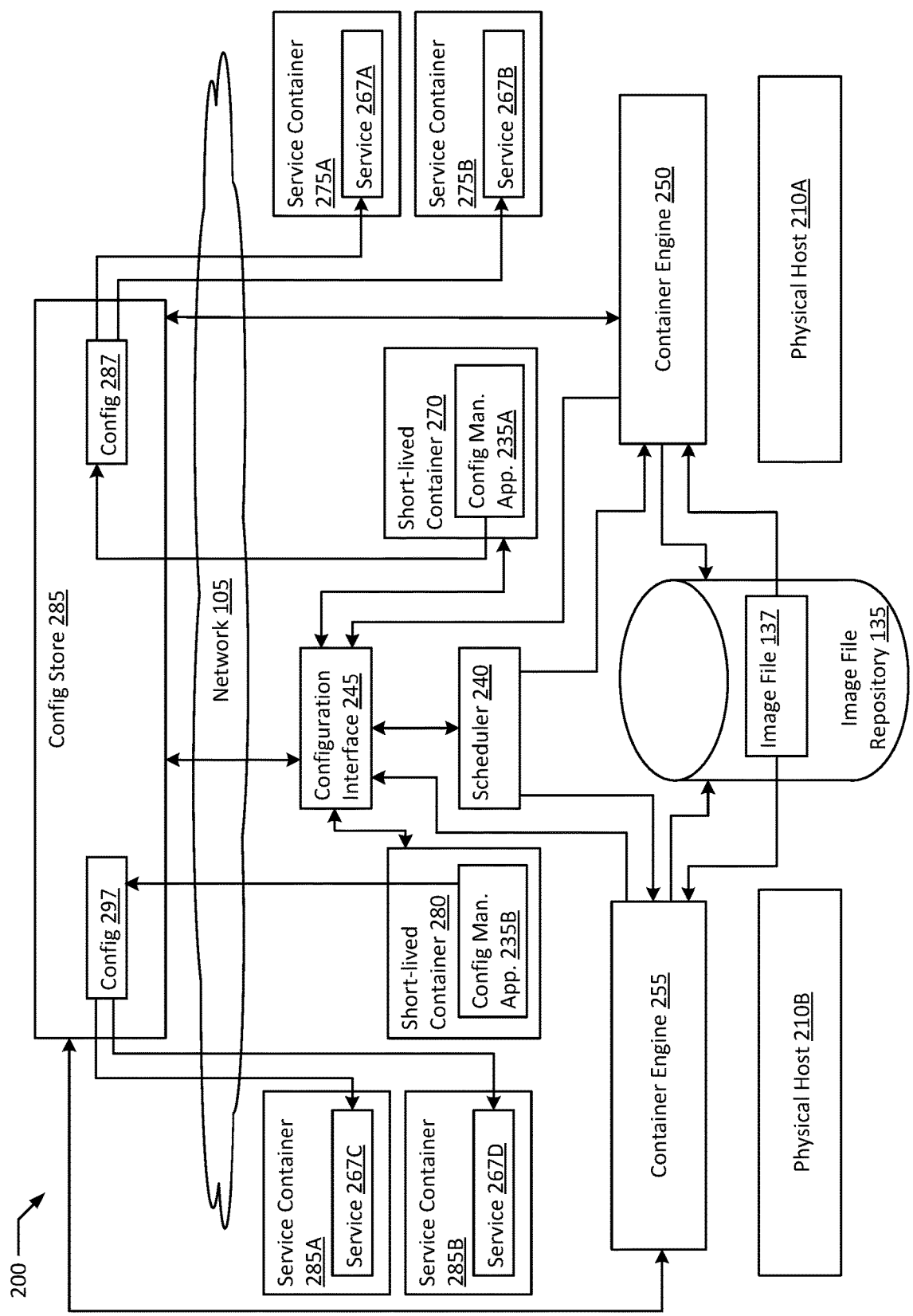
FIG. 2 is a block diagram illustrating a host specific containerized application configuration generation system with centralized configuration in a physical hosting environment according to an example of the present disclosure.

FIG. 2 is a block diagram illustrating a host specific containerized application configuration generation system with centralized configuration in a physical hosting environment according to an example of the present disclosure. Illustrated system 200 depicts a similar system to system 101, where containers (e.g., short-lived containers 270 and 280, and service containers 275A-B and 285A-B) are hosted directly on physical hosts 210A-B. In an example short-lived containers 270 and 280 correspond to short-lived containers 160 and 170 to generate host-specific configuration files (e.g., configurations 287 and 297) associated with respective physical hosts 210A and 210B. In an example, configuration 287 is incompatible with services (e.g., services 267C-D) hosted directly or indirectly (e.g., in service containers 285A-B) on physical host 210B. Similarly, in the example, configuration 297 is incompatible with services (e.g., services 267A-B) hosted directly or indirectly (e.g., in service containers 275A-B) on physical host 210A. In an example, short-lived containers 270 and 280, and service containers 275A-B and 285A-B are all launched from image file 137, and execute on container engines 250 and 255. In an example, container engines 250 and 255 may be any form of suitable hosting platform and/or management system for hosting containers (e.g., Docker® Engine).

In an example, configuration store 285 may be any form of storage system for configuration data, such as configuration files and/or metadata. In an example, configuration store 285 is located across a network from physical hosts 210A and 210B. In an example, configuration store 285 may be implemented as a configuration database (e.g., in a relational database). In another example, configuration store 285 may be implemented as a distributed storage for configuration data such as a distributed key value store (e.g., Etcd). In an example, service containers 275A-B and 285A-B may be configured to query configuration store 285 for configuration settings when executing respective services 267A-D. In an example, the configuration store 285 may be added to an environment variable and/or a path of 275A-B and 285A-B and may be a default location for saving and retrieving configuration data. In an example of a distributed implementation of configuration store 285, persistence and security of configuration settings and values may be maintained through replication across nodes sharing the distributed configuration store 285. In the example, failure of a certain proportionate subset of the nodes in the distributed system would not impact the integrity of the data in the configuration store. In some implementations of configuration store 285 with distributed rather than dedicated storage, it is possible for at least part of a configuration (e.g., configuration 287 or 297), being accessed to be stored on the host accessing the configuration.

In an example, scheduler 240 may be any suitable scheduler (e.g., CoreOS® Fleet, Mesosphere® Marathon, Docker Swarm®, Apache® Mesos, Google® Kubernetes®, Docker® Compose, etc.) for instantiating containers including a component of a container orchestrator (e.g., Google® Kubernetes®) or broader containerization platform (e.g., Red Hat® OpenShift®) capable of scheduling containers to execute on hosts (e.g., physical hosts 210A-B) managed by the scheduler 240. In an example, scheduler 240 may manage requests for scaling up and scaling down compute capacity for service 267A-D hosted on service containers 275A-B and 285A-B launched from image file 137. In the example, scheduler 240 may instruct container engines 250 and 255 to instantiate or reclaim service containers (e.g., service containers 275A-B and 285A-B) based on demand for service 267A-D. In an example, scheduler 240 may be in communication with configuration interface 245. In the example, configuration interface 245 may be an interface through which configuration of configuration management applications 235A-B is managed. In the example, configuration interface 245 may provide an interface such as a command line interface, graphical user interface, application programming interface, etc. for configuration management applications 235A-B. In an example, configuration interface 245 may instruct scheduler 240 to instantiate short-lived containers (e.g., short-lived containers 270 and 280) to configure or reconfigure services 267A-D. In another example, configuration interface 245 may query configuration store 285 to determine whether a configuration (e.g., configurations 287 or 297) exists for a service-host combination. In the example, configuration interface 245 may instruct scheduler 240 to instantiate short-lived container 270 via container engine 250 if configuration 287 was missing, corrupted, or outdated. In the example, configuration interface 245 may then instruct configuration management application 235A to generate and store configuration 287 in configuration store 285 for configuring services 267A-B on service containers 275A-B. In an example, configuration 297 may be incompatible with services 267A-B, even while remaining compatible with services 267C-D launched from an identical copy of the same executable code as services 267A-B. In an example, configuration 297's compatibility with services 267C-D is based on a pairing of service specific settings for services 267A-D and host specific settings for physical host 210B.

Figure 3:
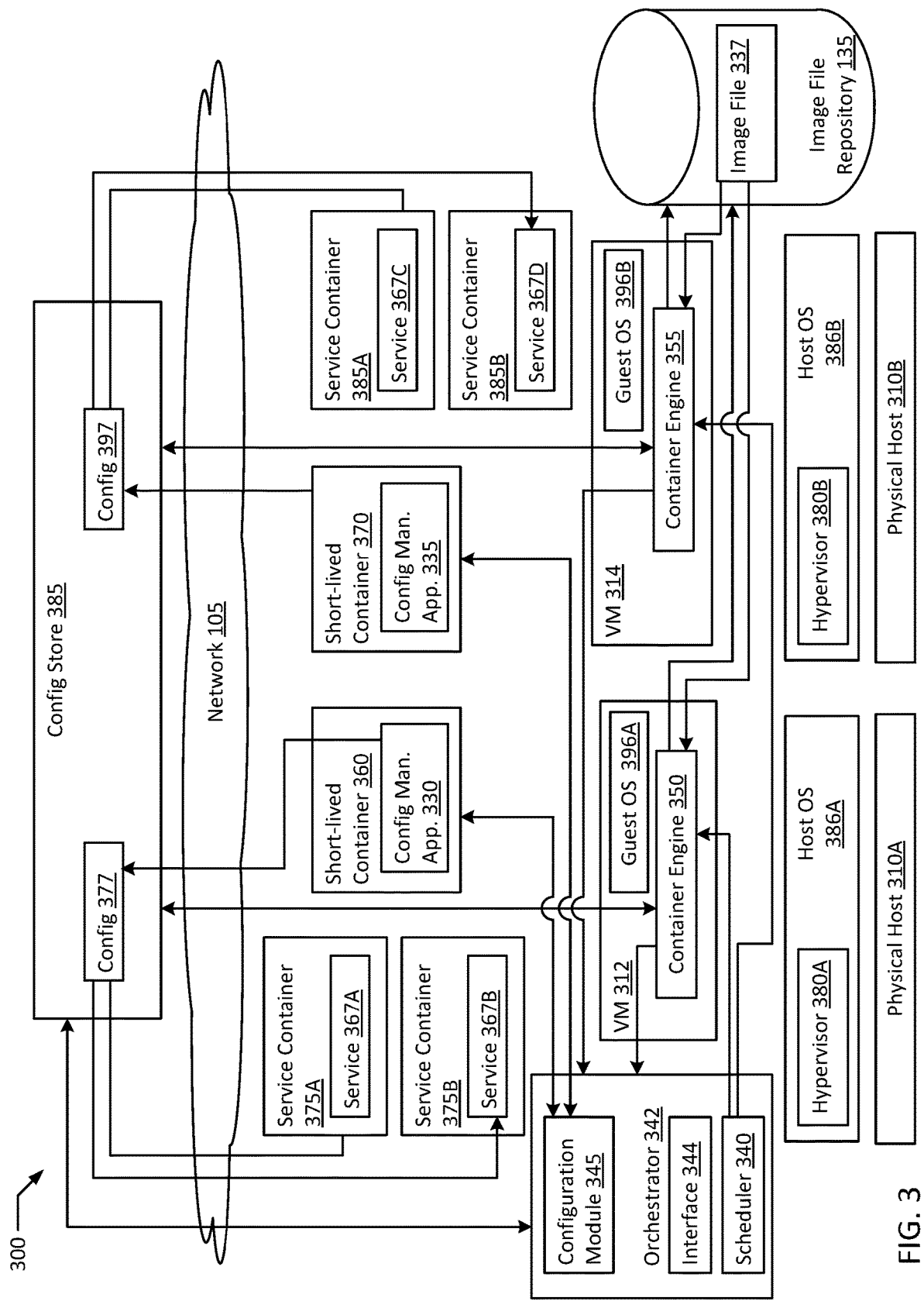
FIG. 3 is a block diagram illustrating a host specific containerized application configuration generation system with orchestration in a virtualized hosting environment according to an example of the present disclosure.

FIG. 3 is a block diagram illustrating a host specific containerized application configuration generation system with orchestration in a virtualized hosting environment according to an example of the present disclosure. Illustrated system 300 depicts a similar system to system 100, where containers (e.g., short-lived containers 360 and 370, and service containers 375A-B and 385A-B) are hosted on VMs 312 and 314, which are in turn hosted on hypervisors 380A-B and host operating systems 386A-B on physical hosts 310A-B. In an example short-lived containers 360 and 370 correspond to short-lived containers 160 and 170, generating host-specific configuration files (e.g., configurations 377 and 397) associated with respective physical hosts 310A and 310B. In an example, short-lived containers 360 and 370, and service containers 375A-B and 385A-B are all launched from image file 337, and execute on top of container engines 350 and 355. In an example, image file 337 may be an image file for a container hosting a service for a video chat service, while image file 137 may be an image file for a container hosting a voice over internet protocol "VOIP" service. In an example, configurations generated by short-lived container 370 (e.g., configuration 397) are incompatible with configurations generated by short-lived container 270 (e.g., configuration 287) even if generated on the same physical host because the configurations are for different services. In an example, container engines 350 and 355 may be any form of suitable hosting platform and/or management system for hosting containers (e.g., Docker® Engine). In an example, by adding a layer of virtual hosts (e.g., VMs 312 and 314), short-lived containers 360 and 370, as well as service containers 375A-B and 385A-B, may be hosted indirectly on physical hosts 310A and 310B even if host OS 386A and/or host OS 386B is incompatible with short-lived containers 360 and 370 and service containers 375A-B and 385A-B. In the example, short-lived containers 360 and 370 and service containers 375A-B and 385A-B only require compatibility with the respective guest OSs 396A-B. Adding a virtualized hosting layer may therefore increase deployment flexibility in environments where a user deploying containers lacks authority to modify the hosting hardware (e.g., in a multi-tenant cloud).

Illustrated system 300 includes many elements corresponding to system 200, including a remote configuration store 385 similar to configuration store 285. In an example, configuration store 385 may be a dedicated configuration storage node. In another example, configuration store 385 may be deployed as a distributed storage service. In an example, orchestrator 342 may be based upon any suitable container orchestration system (e.g., CoreOS® Fleet, Mesosphere® Marathon, Docker Swarm®, Apache® Mesos, Google® Kubernetes®, Docker® Compose, etc.). In an example, orchestrator 342 extends the typical functionality of a container scheduler (e.g., scheduler 340) with a configuration module 345 that manages configuration management applications 330 and 335, as well as the creation and modification of configurations 377 and 397. In an example, interface 344 offers a unified interface for scheduling services from a service centric view. In an example, through scheduler 340 and configuration module 345, interface 344 may deploy containers from copies of image file 377 (e.g., short-lived containers 360 and 370, service containers 375A-B and 385 A-B) on any host node (e.g., VMs 312 and 314, physical hosts 310A-B) accessible to orchestrator 342. In an example, a service may be dynamically scaled up with host specific configurations (e.g., configurations 377 and 397) automatically generated by configuration module 345 on each host where image file 337 is deployed. In an example, services 367A-D may be copies of the same service executed from the same executable code in image file 337.

Figure 4:
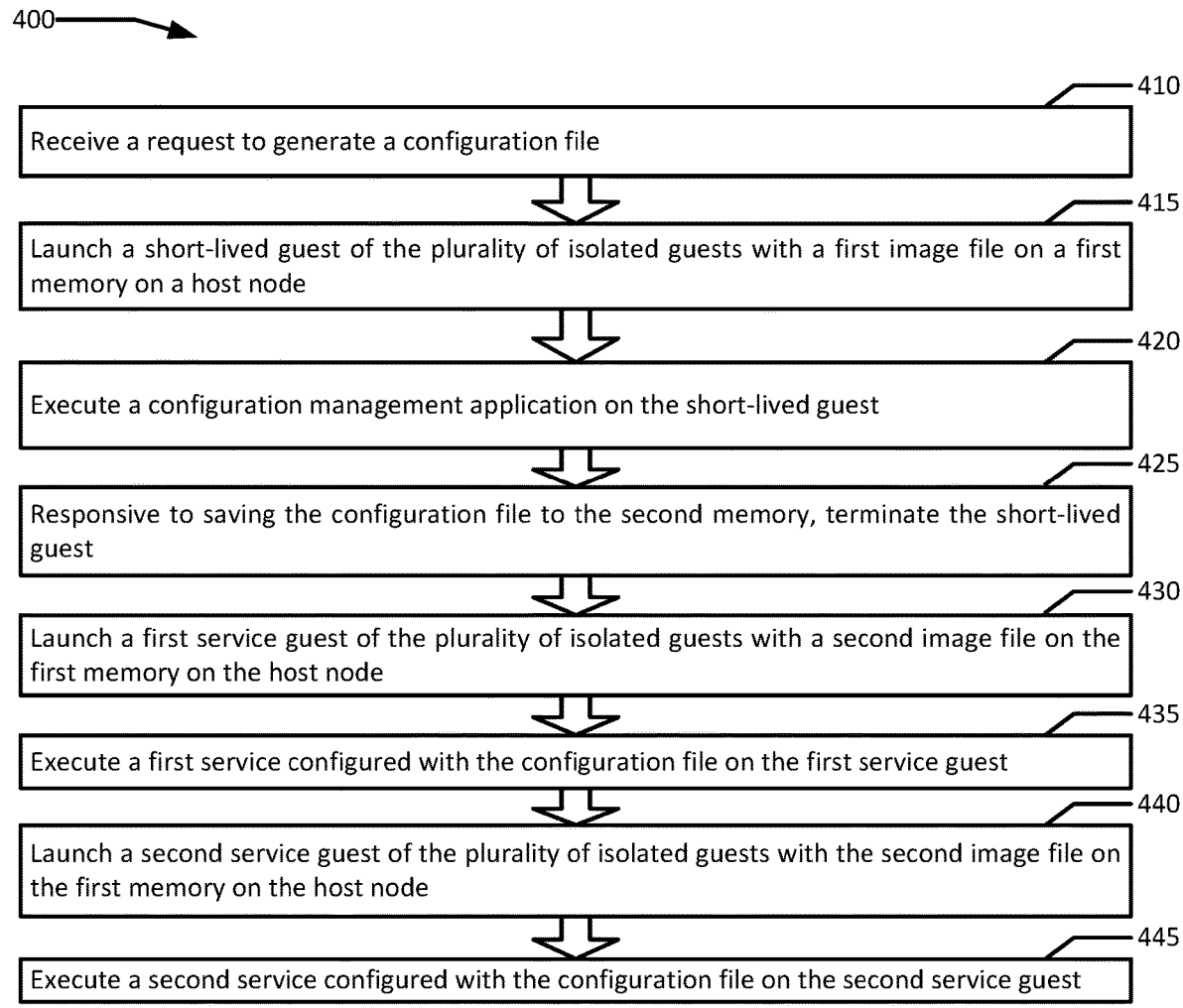
FIG. 4 is a flowchart illustrating an example of host specific containerized application configuration generation according to an example of the present disclosure.

FIG. 4 is a flowchart illustrating an example of host specific containerized application configuration generation according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by physical host 110B with configuration management application 145 on short-lived container 170.

Example method 400 may begin with receiving a request to generate a configuration file (block 410). In an example, the configuration file is associated with a plurality of isolated guests. In an example, physical host 110B may be instructed, for example via I/O 135B, to generate configuration 187 associated with service containers hosting a service (e.g., service containers 175A-B). In an example, the request to generate configuration 187 may be made in anticipation of launching service containers 175A-B and services 177A-B. In an example, physical host 110B may host a container engine analogous to container engines 250 and/or 255.

A short-lived guest of the plurality of isolated guests is launched with a first image file on a first memory on a host node (block 415). In an example, short-lived container 170 is launched with image file 137 retrieved from image file repository 135 on memory device 130C of physical host 110B. In an example, image file 137 may be the same image file used to launch both short-lived container 170, as well as service containers 175A-B. In the example, image file 137 includes both configuration management application 145, as well as an executable code from which services 177A-B are launched. In an example, when image file 137 is launched as short-lived container 170, the executable code may be disabled. In the example, when image file 137 is launched as service containers 175A-B, the configuration management application 145 may be disabled. In various examples, any suitable method of disabling the executable code and/or configuration management application 145 may be employed. For example, user account permissioning may be leveraged to disable the executable code and/or configuration management application 145. In another example, the disabling of executable code and/or configuration management application 145 may be overridden, for example, by an administrator executing direct control. In an example, a container engine executing on physical host 110B may affirmatively execute configuration management application 145 when image file 137 is launched as short-lived container 170, but may only execute the executable code and launch service 177A or 177B when image file 137 is launched as a service container (e.g., service containers 175A-B). In an alternative example, short-lived container 170 may be launched from a different image file from service containers 175A-B. For example, short-lived container 170 may be launched from an image file that does not include the executable code. In an example, instantiating short-lived container 170 from a stripped down image file without the executable code may be faster than using image file 137. However, a cost of using different image files for short-lived containers and service containers may be overhead in maintaining up to twice as many image files in a given environment. In an example, the addition of configuration management application 145 may add a negligible amount of size to image file 137.

A configuration management application is executed on the short-lived guest (block 420). In an example, the configuration management application generates and saves the configuration file to a second memory. For example, configuration management application 145 executes on short-lived container 170 to generate configuration 187 and save configuration 187 to configuration store 185. In an example, configuration 187 includes host specific settings (e.g., firewall settings) of physical host 110B. In an example, configuration store 185 may be a located in a memory device mounted to physical host 110B (e.g., memory device 130C). For example, configuration store 185 may be physically mounted to physical host 110B, or configuration store 185 may be a logical volume mounted to physical host 110B's operating system, such as a persistent storage volume in a network storage node such as a Storage Area Network ("SAN") or Network Attached Storage ("NAS") device. In an example, short-lived container 170 may be permissioned to access configuration store 185 through physical host 110B. In another example, configuration store 185 may be mounted to guests on physical host 110B directly (e.g., short-lived container 170 and/or service containers 175A-B). In an example, short-lived container 170 may mount configuration store 185 based on instructions in image file 137, or instructions from a container engine, container scheduler, container orchestrator, configuration interface, or any other suitable component.

Responsive to saving the configuration file to the second memory, the short-lived guest is terminated (block 425). In an example, short-lived container 170 may terminate itself after saving configuration 187 to configuration store 185. In another example, short-lived container 170 may be terminated at the request of another component (e.g., a scheduler, a configuration interface, a container orchestrator, physical host 110B, etc.). In an example, rather than being terminated, short-lived container 170 may be repurposed into a service container by executing the executable code associated with a service if permissions allow. In such an example, configuration management application 145 may be disabled. In an example, short-lived container 170 may be terminated immediately after configuration 187 is saved. For example, an acknowledgement from configuration store 185 of a successful saving of configuration 187 may trigger a termination sequence of short-lived container 170.

A first service guest of the plurality of isolated guests is launched with a second image file on the first memory on the host node (block 430). In an example, service container 175A is instantiated from image file 137 in memory device 130C on physical host 110B. In another example, service container 175A may be instantiated from a separate image file from short-lived container 170 (e.g., one without configuration management application 145). A first service configured with the configuration file is execute on the first service guest (block 435). In an example, service 177A executes on service container 175A. In the example, a client device 155 may connect to service 177A to access functionality provided by service 177A (e.g., a VOIP call). In an example, service 177A is launched as part of a startup sequence of service container 175A. In an example, a container engine may launch service 177A after service container 175A is activated. A second service guest of the plurality of isolated guests is launched with the second image file on the first memory on the host node (block 440). In an example, service container 175B is instantiated from image file 137 in memory device 130C on physical host 110B. A second service configured with the configuration file is executed on the second service guest (block 445). In an example, service 177B executes on service container 175B. In an example, numerous additional service containers may be launched on physical host 110B from image file 137 to scale up processing capacity of the service by executing more copies in addition to services 177A-B. In an example, a scheduler may be configured to mount configuration store 185 to each isolated guest of the plurality of isolated guests (e.g., short-lived container 170 and service containers 175A-B) launched on memory device 130C from image file 137.

In an example, a second short-lived container is launched on physical host 110B, and the second short-lived guest saves a second configuration file in configuration store 185. In the example, a third service container is launched from image file 137 with an additional third copy of the service, which is configured with the second configuration file. In an example, the second configuration file overwrites the configuration 187 and service 177A is reconfigured with the second configuration file. In an example, each other copy of the service executing on physical host 110B including in any service guests (e.g., service containers 175 A-B) are also reconfigured by the second configuration file.

Figure 5:
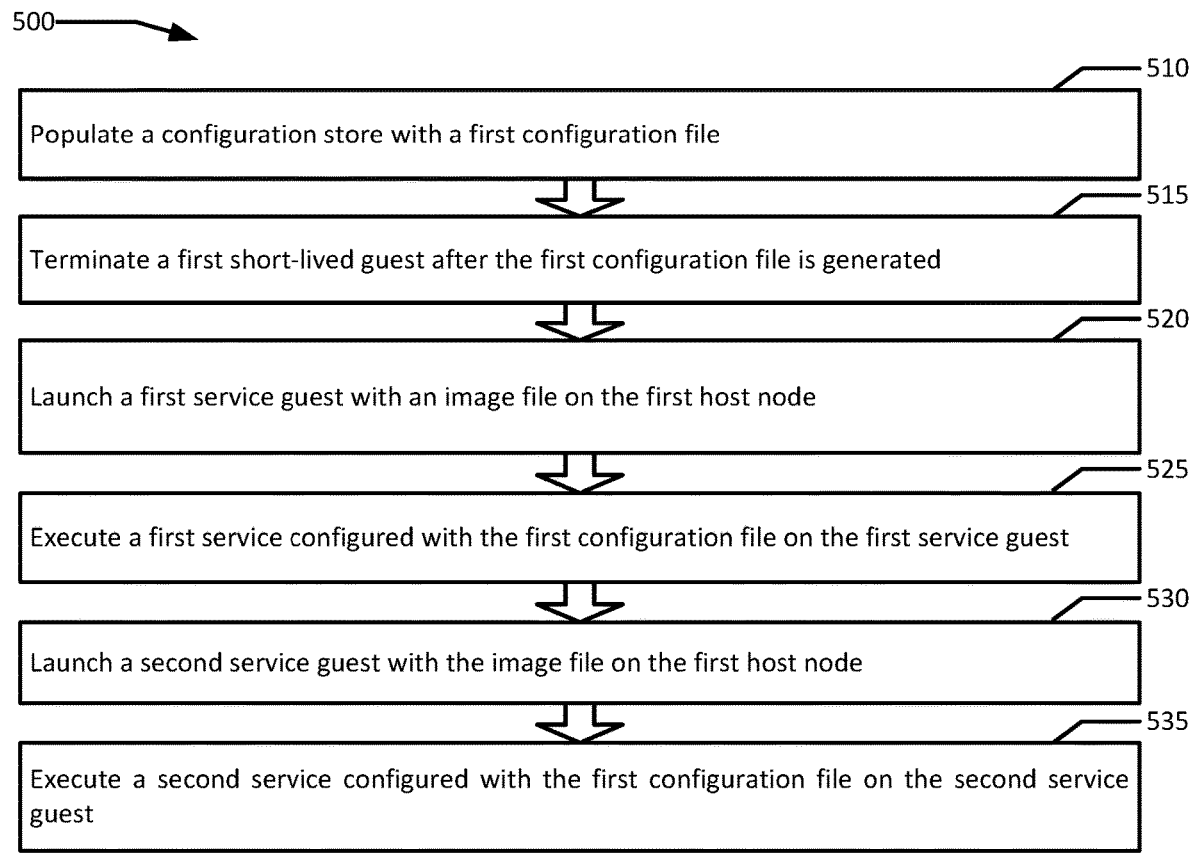
FIG. 5 is a flowchart illustrating an example of host specific containerized application configuration generation with network configuration distribution according to an example of the present disclosure.

FIG. 5 is a flowchart illustrating an example of host specific containerized application configuration generation with network configuration distribution according to an example of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example, the method 500 is performed by container engine 250 in conjunction with a scheduler 240, a configuration interface 245, and a configuration store 285.

Example method 500 may begin with populating a configuration store with a first configuration file (block 510). In an example, the configuration store is hosted across a network from a first host node, and the first configuration file is generated by a first short-lived guest launched from a first image file on the first host node executing a configuration management application. For example, container engine 250 may instantiate short-lived container 270 on physical host 210A with image file 137 retrieved from image file repository 135. In the example, configuration management application 235A may execute on short-lived container 270 to generate configuration 287 and to populate configuration store 285 with configuration 287. In an example, short-lived container 270 may populate configuration store 285 with configuration 287 without executing a configuration management application. In an example, configuration management application 235A may have certain components that are incompatible with short-lived container 270 disabled, for example, components for installing and/or executing the executable code associated with services 267A-D.

In an example, the configuration management application 235A is controlled by a configuration interface 245. In the example, configuration interface 245 may allow a user to control numerous configuration management applications on different hosts in an environment. For example, configuration interface 245 may control configuration management applications 235A-B for generating configurations 287 and 297 for services 267A-D compatible with respective physical hosts 210A and 210B. In an example configuration interface 245 may query configuration store 285 to determine whether launching a short-lived container to generate a configuration is necessary. In an example, configuration interface 245 may instruct scheduler 240 to directly launch service container 275B on physical host 210A after detecting that configuration 287 is available. In an example, configuration 287 includes host specific settings of physical host 210A. In an example, the first short-lived guest is terminated after the first configuration file is generated (block 515). For example, short-lived container 270 may self-terminate after configuration 287 is successfully saved to configuration store 285. In another example, scheduler 240 or container engine 250 may instruct short-lived container 270 to be terminated and reclaimed.

A first service guest is launched with a second image file on the first host node (block 520). In an example, service container 275A is instantiated from image file 137 on physical host 210A. In an example, scheduler 240 may be configured to mount configuration store 285 to short-lived container 270 and/or service containers 275A-B. In another example, image file 137 may include access instructions for configuration store 285. For example, a distributed storage implementation for configuration store 285, such as one leveraging Etcd, may be built into image file 137 without actually mounting the distributed storage as a storage volume. In an example, configuration store 285 may be implemented as a persistent storage claim for image file 137. In another example, service container 275A may be instantiated from a separate image file from short-lived container 170 (e.g., one without configuration management application 145). A first service configured with the first configuration file is executed on the first service guest (block 525). In an example, the first configuration file is retrieved by the first service guest from the configuration store. In an example, service 267A configured with configuration 287 executes on service container 275A. In an example, configuration 287 is retrieved by service container 275A from remote configuration store 285. In an example, configuration 287 has host specific settings for physical host 210A.

A second service guest is launched with a second image file on the first host node (block 530). In an example, service container 275B is instantiated from image file 137 on physical host 210A. A second service configured with the first configuration file is executed on the second service guest (block 535). In an example, the first configuration file is retrieved by the second service guest from the configuration store. In an example, service 267B configured with configuration 287 executes on service container 275B. In an example, configuration 287 is retrieved by service container 275B from remote configuration store 285. In an example, configuration store 285 is across network 105 from physical host 210A, and configuration store 285 is queried by service container 275B to retrieve configuration 285. In an example, configuration 297 is saved to configuration store 285 by short-lived container 280 on physical host 210B. In the example, configuration 297 includes host specific settings of physical host 210B, and service 267C configured with configuration 297 executes on service container 285A on physical host 210B. In an example configuration 297 is not compatible with services 267A-B, while configuration 287 is not compatible with services 267C-D.

Figure 6:
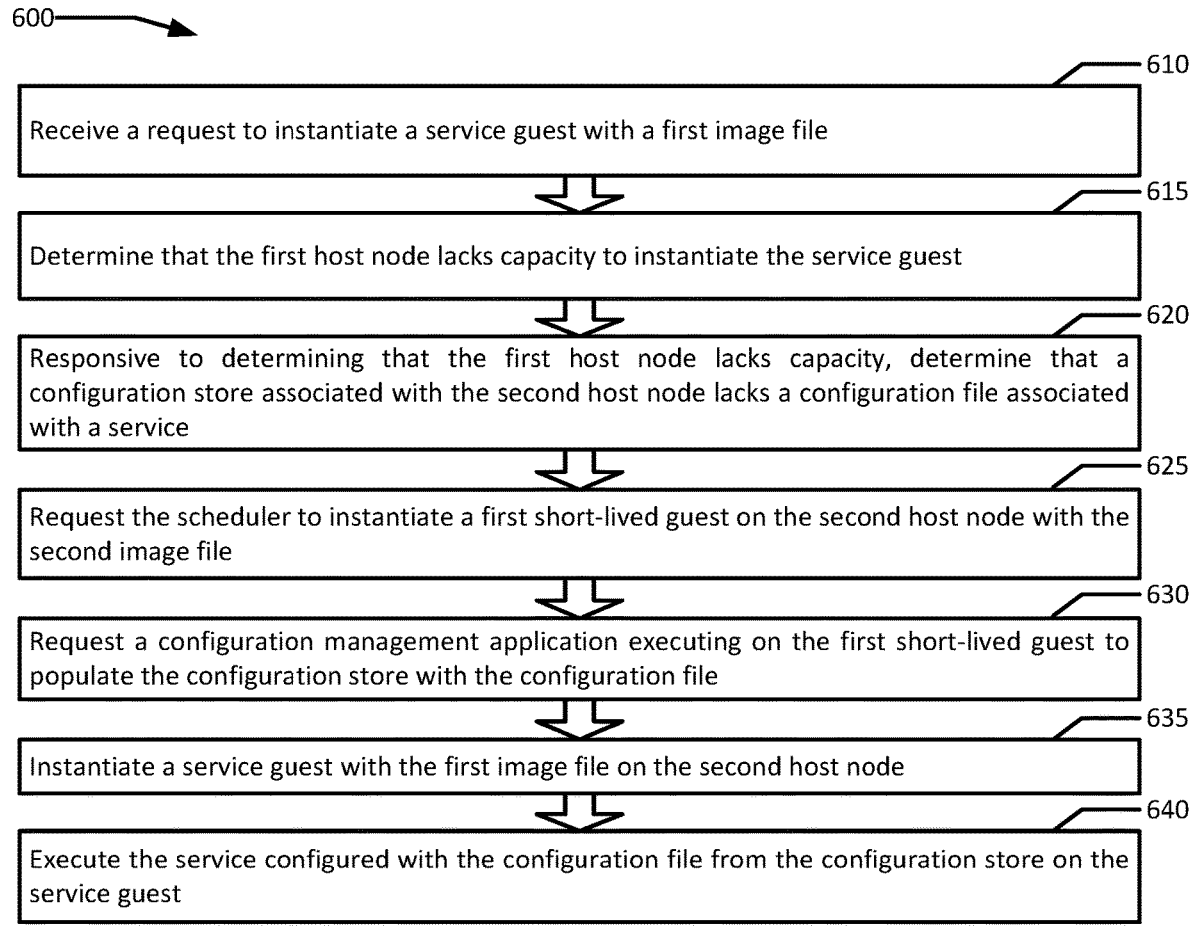
FIG. 6 is a flowchart illustrating an example of orchestrated containerized service deployment with host specific containerized application configuration generation according to an example of the present disclosure.

FIG. 6 is a flowchart illustrating an example of orchestrated containerized service deployment with host specific containerized application configuration generation according to an example of the present disclosure. Although the example method 600 is described with reference to the flowchart illustrated in FIG. 6, it will be appreciated that many other methods of performing the acts associated with the method 600 may be used. For example, the order of some of the blocks may be changed, certain blocks may be combined with other blocks, and some of the blocks described are optional. The method 600 may be performed by processing logic that may comprise hardware (circuitry, dedicated logic, etc.), software, or a combination of both. In an example, the method 600 is performed by orchestrator 342 in conjunction with VMs 312 and 314.

A request to instantiate a first service guest with a first image file is received (block 610). In an example, scheduler 340 receives a request to instantiate service container 385A with image file 337. In an example, the request to scheduler 340 may originate from a user. In another example, the request to scheduler 340 may result from an automated process, such as capacity tracking related to a service (e.g., services 367A-D). A determination is made that a first host node lacks capacity to instantiate the first service guest (block 615). In an example, a first service guest instantiated with the first image file executes a service on the first host node and a second service guest instantiated with the first image file also executes the service on the first host node. In an example, scheduler 340 determines that VM 312, which is presently executing first and second service containers 375A-B instantiated from image file 337 lacks capacity for a further instance of a new service container instantiated from image file 337. In an example, service containers 375A and 375B execute respective services 367A and 367B which are two copies of the same service launched from an executable code in image file 337. In an example, a lack of capacity may be based on insufficient system resources (e.g., disk space, memory capacity, processor capacity, network bandwidth).

In response to determining that the first host node lacks capacity, a determination is made that a configuration store associated with the second host node lacks a first configuration file associated with the service (block 620). In an example, configuration module 345 determines that a configuration file associated with VM 314 is not available. For example, configuration module 345 may query configuration store 385 to determine that there is no configuration file associated with the executable code of service 367A-D for VM 314. In an example, configuration store 385 may be a separate remote configuration storage unit. In another example, configuration store 385 may be a component of orchestrator 342. A first short-lived guest is instantiated on the second host node with the second image file is requested (block 625). In an example, configuration module 345 may request the scheduler 340 to instantiate short-lived container 370 on VM 314 with image file 337. In another example, short-lived container 370 may be instantiated with a separate image file (e.g., an image file without the executable code for services 367A-D).

A configuration management application executing on the first short-lived guest is requested to populate the configuration store with the first configuration file (block 630). In an example, the first short-lived guest self-terminates after generating the first configuration file. In an example, configuration module 345 request and/or instructs configuration management application 335 executing on short-lived container 370 to populate configuration store 385 with configuration 397. In an example, short-lived container 370 self-terminates after generating configuration 397. A service guest is instantiated with the first image file on the second host node (block 635). For example, the service guest is a third service guest launched from the same image file 337 as first and second service containers 375A-B. In an example, scheduler 340 instructs container engine 355 to instantiate service container 385A with image file 337 on VM 314. The service configured with the first configuration file from the configuration store is executed on the service guest (block 640). In an example, service 367C configured with configuration 397 from configuration store 385 is executed on VM 314.

Figure 7:
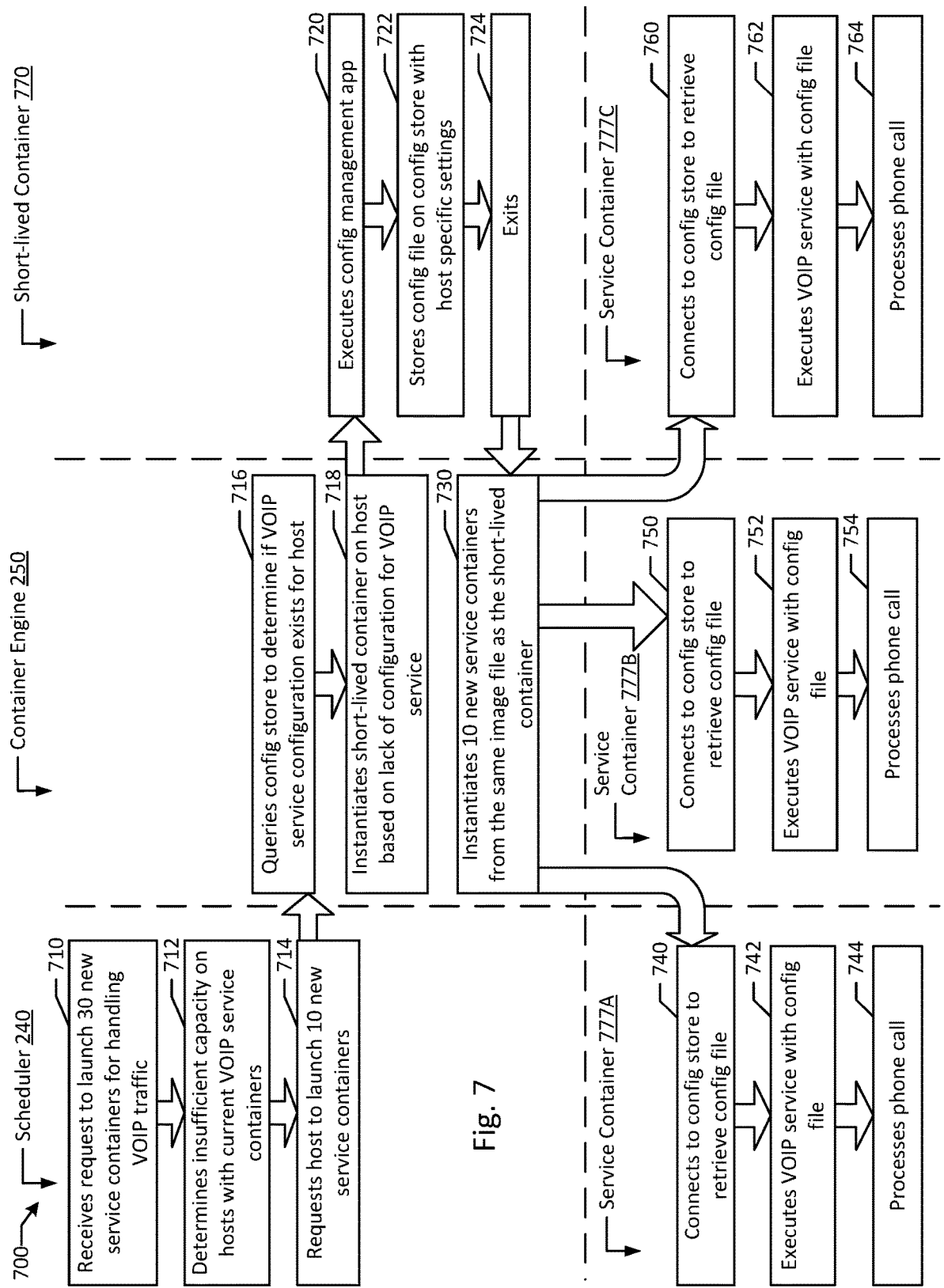
FIG. 7 is flow diagram of an example of host specific containerized application configuration generation according to an example of the present disclosure.

FIG. 7 is flow diagram of an example of host specific containerized application configuration generation according to an example of the present disclosure. Although the examples below are described with reference to the flowchart illustrated in FIG. 7, it will be appreciated that many other methods of performing the acts associated with FIG. 7 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 700, a scheduler 240 and a container engine 250 instantiate several instances of configured containerized applications.

In example system 700, scheduler 240 receives a request to launch 30 new service containers for handling a spike in VOIP traffic for a VOIP service hosted in a cloud environment (block 710). In the example, scheduler 240 determines that there is insufficient compute capacity on host nodes currently hosting VOIP service containers (block 712). In an example, scheduler 240 requests a host node (e.g., physical host 210A) to launch 10 new VOIP service containers (block 714). In an example, container engine 250 on physical host 210A receives the request to launch 10 new VOIP service containers. In the example, container engine 250 queries configuration store 285 to determine whether a VOIP service configuration file exists in configuration store 285 for physical host 210A (block 716).

In an example, based on determining that no VOIP service configuration exists in configuration store 285 for physical host 210A, container engine 250 instantiates a short-lived container 770 on physical host 210A (block 718). In an example, short-lived container 770 executes a configuration management application (block 720). In the example, the configuration management application on short-lived container 770 generates a configuration for the VOIP service and stores the configuration file with physical host 210A specific settings in configuration store 285 (block 722). In an example, short-lived container 770 then self-terminates by exiting (block 724). In an example, upon detecting that short-lived container 770 has exited, container engine 250 instantiates ten new service containers from the same image file as the one used for short-lived container 770 (block 730). For example, the ten new service containers include illustrated service containers 777A-C.

In an example, service container 777A launched by container engine 250 connects to configuration store 285 and retrieves the configuration file generated by short-lived container 770 (block 740). In the example, service container 777A then executes the VOIP service with the configuration file (block 742). In the example, the VOIP service on service container 777A then processes a phone call (block 744). In an example, service container 777B launched by container engine 250 connects to configuration store 285 and retrieves the configuration file generated by short-lived container 770 (block 750). In the example, service container 777B then executes the VOIP service with the configuration file (block 752). In the example, the VOIP service on service container 777B then processes a phone call (block 754). In an example, service container 777C launched by container engine 250 connects to configuration store 285 and retrieves the configuration file generated by short-lived container 770 (block 760). In the example, service container 777C then executes the VOIP service with the configuration file (block 762). In the example, the VOIP service on service container 777C then processes a phone call (block 764). In an example, having short-lived container 770 generate a shareable configuration file for service containers 777A-C and their other sister containers launched by container engine 250 avoids repeating the configuration generation latency in launching each of the service containers, resulting in a significant net decrease in startup latency over the ten service containers launched by container engine 250.

Figure 8:
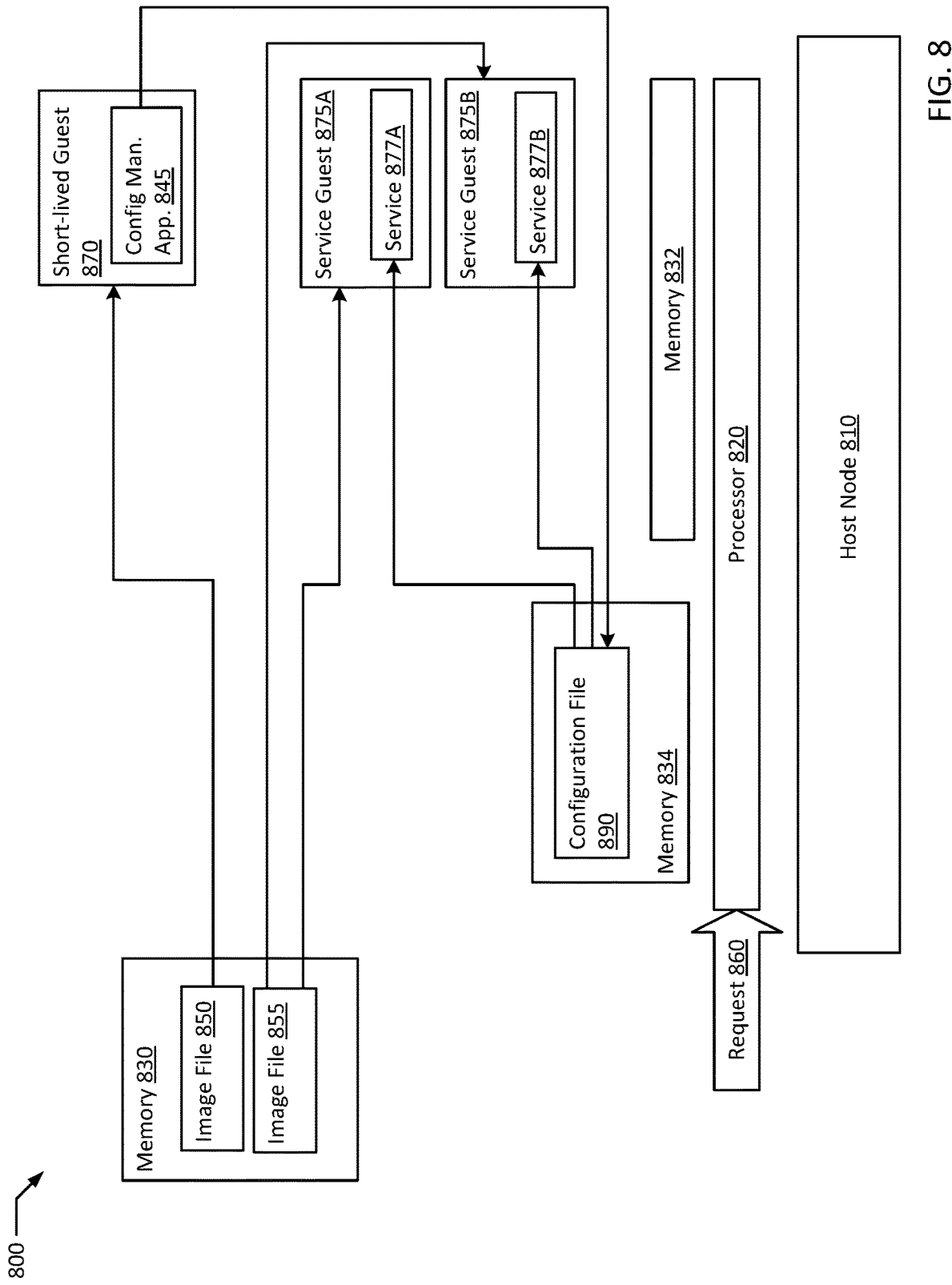
FIG. 8 is a block diagram of an example system for host specific containerized application configuration generation according to an example of the present disclosure.

FIG. 8 is a block diagram of an example system for host specific containerized application configuration generation according to an example of the present disclosure. Example system 800 includes image file 850 and image file 855 stored on memory 830. Memories 832 and 834 are associated with host node 810 on which processor 820 executes to receive a request 860 to generate configuration file 890. Configuration file 890 is associated with a plurality of isolated guests (e.g., short-lived guest 870 and service guests 875A-B). Short-lived guest 870 is launched with image file 850 on memory 832 on host node 810. Configuration management application 845 is executed on short-lived guest 870, where configuration management application 845 generates and saves configuration file 890 to memory 834. In response to saving configuration file 890 to memory 834, short-lived guest 870 is terminated. Service guest 875A is launched with image file 855 on memory 832 on host node 810. Service 877A is configured with configuration file 890 on service guest 875A. Service guest 875B is launched with image file 855 on memory 832 on host node 810. Service 877B is configured with configuration file 890 on service guest 875B.

Figure 9:
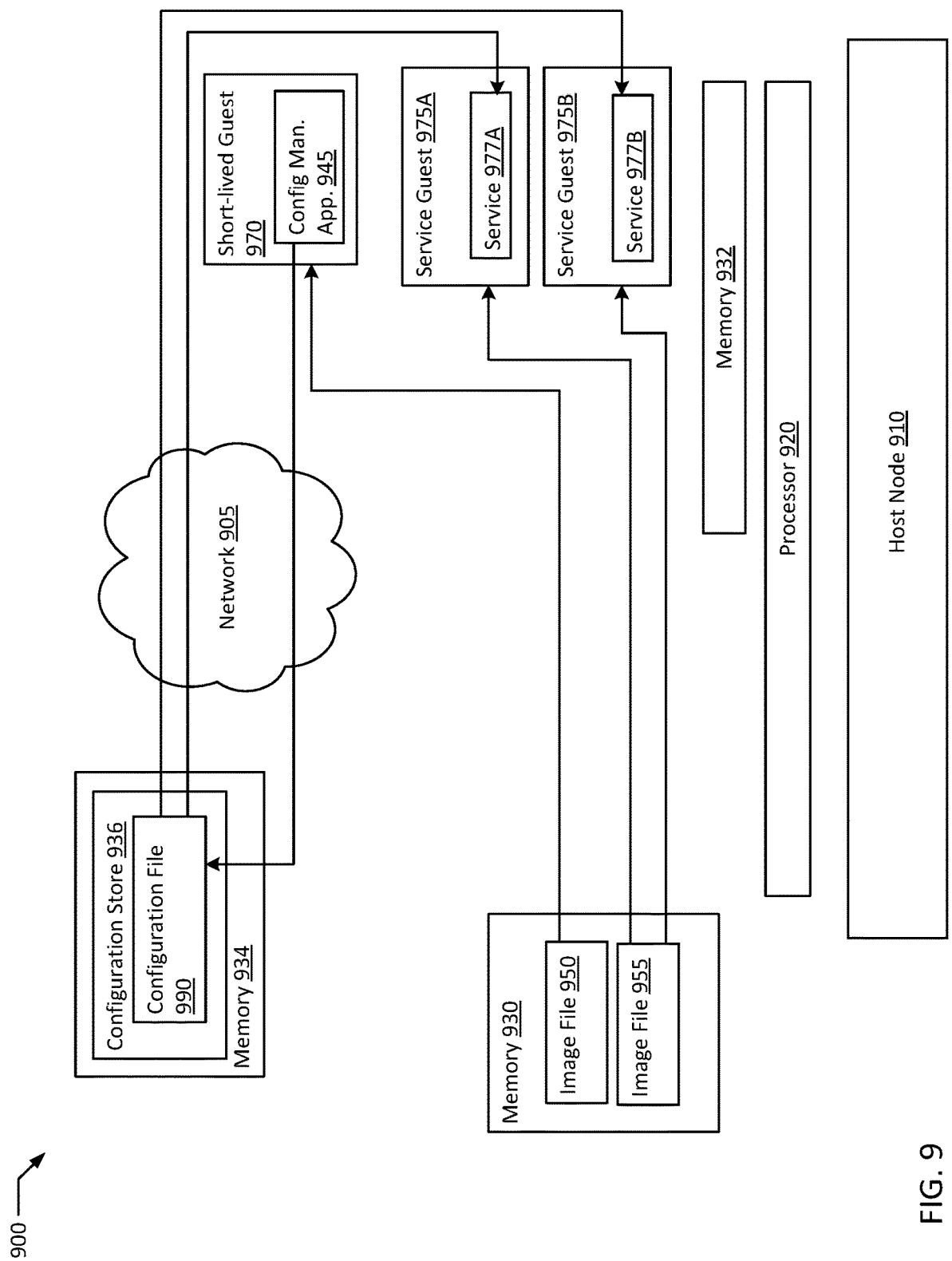
FIG. 9 is a block diagram of an example system for host specific containerized application configuration generation with network configuration distribution according to an example of the present disclosure.

FIG. 9 is a block diagram of an example system for host specific containerized application configuration generation according to an example of the present disclosure. Example system 900 includes image file 950 and image file 955 stored on memory 930, memory 932 associated with host node 910, configuration store 936 hosted on memory 934 across a network 905 from memory 932, and processor 920. Configuration store 936 is populated with configuration file 990, where configuration file 990 is generated by short-lived guest 970 launched from image file 950 on host node 910 executing a configuration management application 945. Short-lived guest 970 is terminated after configuration file 990 is generated. Service guest 975A is launched with image file 955 on host node 910. Service 977A configured with configuration file 990 executes on service guest 975A, where configuration file 990 is retrieved by service guest 975A from configuration store 936. Service guest 975B is launched with image file 955 on host node 910. Service 977B configured with configuration file 990 executes on service guest 975B, where configuration file 990 is retrieved by service guest 975B from configuration store 936.

Figure 10:
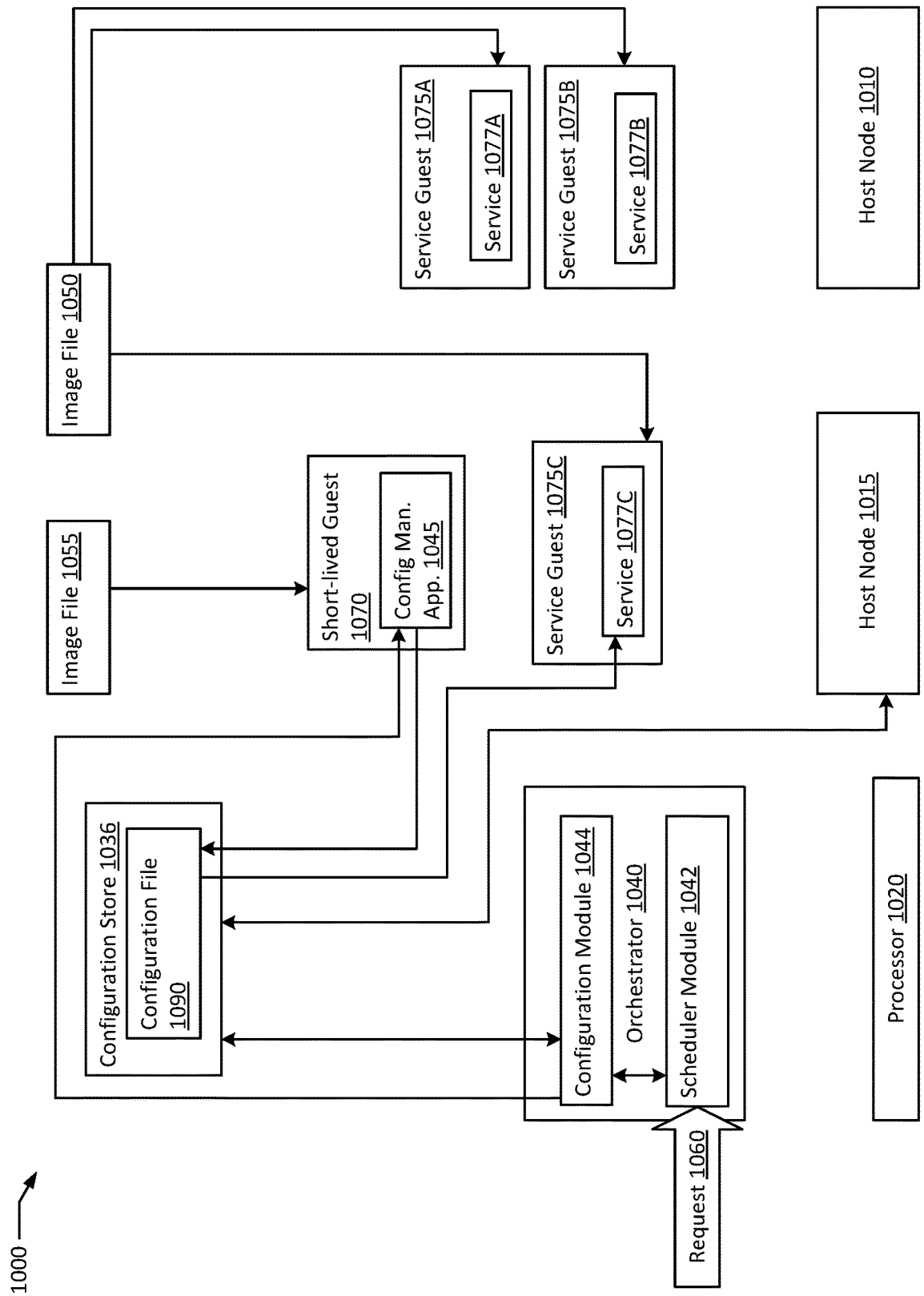
FIG. 10 is a block diagram of an example system for orchestrated containerized service deployment with host specific containerized application configuration generation according to an example of the present disclosure.

FIG. 10 is a block diagram of an example system for host specific containerized application configuration generation according to an example of the present disclosure. Example system 1000 includes image files 1050 and 1055 and host nodes 1010 and 1015. Service guest 1075A is instantiated with image file 1050 and executes service 1077A on host node 1010, and service guest 1075B is instantiated with image file 1050 and executes service 1077B on host node 1010. An orchestrator 1040 includes a scheduler module 1042 and a configuration module 1044. The orchestrator 1040 executes on processors 1020 to receive, by scheduler module 1042, a request 1060 to instantiate service guest 1075C with image file 1050. Scheduler module 1042 determines that host node 1010 lacks capacity to instantiate service guest 1075C. In response to determining that host node 1010 lacks capacity, configuration module 1044 determines that configuration store 1036 associated with host node 1015 lacks configuration file 1090 associated with service 1077C. Configuration module 1044 requests scheduler module 1042 to instantiate short-lived guest 1070 on host node 1015 with image file 1055. Configuration module 1044 requests configuration management application 1045 executing on short-lived guest 1070 to populate configuration store 1036 with configuration file 1090, where short-lived guest 1070 self-terminates after generating configuration file 1090. Service guest 1075C is instantiated with image file 1050 on host node 1015. Service 1077C configured with configuration file 1090 from configuration store 1036 is executed on service guest 1075C.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system of generating configuration files comprises: a first image file and a second image file stored on a first memory; a second memory and a third memory associated with a first host node; and one or more processors executing to: receive a request to generate a first configuration file, wherein the first configuration file is associated with a plurality of isolated guests; launch a first short-lived guest of the plurality of isolated guests with the first image file on the second memory on the first host node; execute a configuration management application on the first short-lived guest, wherein the configuration management application generates and saves the first configuration file to the third memory; responsive to saving the first configuration file to the third memory, terminate the first short-lived guest; launch a first service guest of the plurality of isolated guests with the second image file on the second memory on the first host node; execute a first service configured with the first configuration file on the first service guest; launch a second service guest of the plurality of isolated guests with the second image file on the second memory on the first host node; and execute a second service configured with the first configuration file on the second service guest.

In accordance with a 2nd exemplary aspect of the present disclosure, which may be used in combination with any one or more of the preceding aspects (e.g., the 1st aspect), wherein the first image file is the same as the second image file and the first image file includes the configuration management application and an executable code, and the first service and the second service are launched from the executable code. In accordance with a 3rd exemplary aspect of the present disclosure, which may be used in combination with any one or more of the preceding aspects (e.g., the 2nd aspect), wherein the executable code is disabled in the first short-lived guest. In accordance with a 4th exemplary aspect of the present disclosure, which may be used in combination with any one or more of the preceding aspects (e.g., the 2nd aspect), wherein the configuration management application is disabled in the first service guest and the second service guest.

In accordance with a 5th exemplary aspect of the present disclosure, which may be used in combination with any one or more of the preceding aspects (e.g., the 1st aspect), wherein the third memory is mounted to the first host node. In accordance with a 6th exemplary aspect of the present disclosure, which may be used in combination with any one or more of the preceding aspects (e.g., the 1st aspect), wherein the third memory is mounted to the first short-lived guest, the first service guest, and the second service guest. In accordance with a 7th exemplary aspect of the present disclosure, which may be used in combination with any one or more of the preceding aspects (e.g., the 6th aspect), wherein a scheduler is configured to mount the third memory to each isolated guest of the plurality of isolated guests launched on the second memory from the second image file.

In accordance with an 8th exemplary aspect of the present disclosure, which may be used in combination with any one or more of the preceding aspects (e.g., the 1st aspect), wherein a second short-lived guest is launched on the first host node, the second short-lived guest saves a second configuration file in the third memory, a third service guest is launched with a third service, and the third service is configured with the second configuration file. In accordance with a 9th exemplary aspect of the present disclosure, which may be used in combination with any one or more of the preceding aspects (e.g., the 8th aspect), wherein the second configuration file overwrites the first configuration file and the first service is reconfigured with the second configuration file.

In accordance with a 10th exemplary aspect of the present disclosure, which may be used in combination with any one or more of the preceding aspects (e.g., the 1st aspect), wherein the configuration management application is controlled by a configuration interface. In accordance with an 11th exemplary aspect of the present disclosure, which may be used in combination with any one or more of the preceding aspects (e.g., the 1st aspect), wherein the first host node is one of a physical host and a virtual machine. In accordance with a 12th exemplary aspect of the present disclosure, which may be used in combination with any one or more of the preceding aspects (e.g., the 1st aspect), wherein the first service is launched as part of a startup sequence of the first service guest. In accordance with a 13th exemplary aspect of the present disclosure, which may be used in combination with any one or more of the preceding aspects (e.g., the 1st aspect), wherein the first configuration file includes first host specific settings of the first host node. In accordance with a 14th exemplary aspect of the present disclosure, which may be used in combination with any one or more of the preceding aspects (e.g., the 13th aspect), wherein a second configuration file is saved to the third memory by a second short-lived guest on a second host node, the second configuration file including second host specific settings of the second host node, and a third service configured with the second configuration file executes on a third service guest on the second host node. In accordance with a 15th exemplary aspect of the present disclosure, which may be used in combination with any one or more of the preceding aspects (e.g., the 1st aspect), wherein the third memory is a configuration storage across a network from the host node, and the configuration storage is queried by the first service guest to retrieve the first configuration file.

Aspects of the subject matter described herein may be useful alone or in combination with one or more other aspects described herein. In a 16th exemplary aspect of the present disclosure, a method of generating configuration files comprises: receiving a request to generate a first configuration file, wherein the first configuration file is associated with a plurality of isolated guests; launching a first short-lived guest of the plurality of isolated guests with a first image file on a first memory on a host node; executing a configuration management application on the first short-lived guest, wherein the configuration management application generates and saves the first configuration file to a second memory; responsive to saving the first configuration file to the second memory, terminating the first short-lived guest; launching a first service guest of the plurality of isolated guests with a second image file on the first memory on the host node; executing a first service configured with the first configuration file on the first service guest; launching a second service guest of the plurality of isolated guests with the second image file on the first memory on the host node; and executing a second service configured with the first configuration file on the second service guest.

In accordance with a 17th exemplary aspect of the present disclosure, which may be used in combination with any one or more of the preceding aspects (e.g., the 16th aspect), wherein the first image file is the same as the second image file, further comprises: disabling an executable code in the first short-lived guest, wherein the first service and the second service are launched from the executable code; and disabling the configuration management application on the first service guest and the second service guest. In accordance with a 18th exemplary aspect of the present disclosure, which may be used in combination with any one or more of the preceding aspects (e.g., the 16th aspect), wherein a second short-lived guest is launched on the host node and the second short-lived guest saves a second configuration file in the third memory overwriting the first configuration file. In accordance with a 19th exemplary aspect of the present disclosure, which may be used in combination with any one or more of the preceding aspects (e.g., the 16th aspect), wherein the second memory is a configuration storage across a network from the host node, and the configuration storage is queried by the first service guest to retrieve the first configuration file.

Aspects of the subject matter described herein may be useful alone or in combination with one or more other aspects described herein. In a 20th exemplary aspect of the present disclosure, a computer-readable non-transitory storage medium storing executable instructions of generating configuration files, which when executed by a computer system, cause the computer system to: receive a request to generate a configuration file, wherein the configuration file is associated with a plurality of isolated guests; launch a short-lived guest of the plurality of isolated guests with a first image file on a first memory on a host node; execute a configuration management application on the short-lived guest, wherein the configuration management application generates and saves the configuration file to a second memory; responsive to saving the configuration file to the second memory, terminate the short-lived guest; launch a first service guest of the plurality of isolated guests with a second image file on the first memory on the host node; execute a first service configured with the configuration file on the first service guest; launch a second service guest of the plurality of isolated guests with the second image file on the first memory on the host node; and execute a second service configured with the configuration file on the second service guest.

Aspects of the subject matter described herein may be useful alone or in combination with one or more other aspects described herein. In a 21st exemplary aspect of the present disclosure, a system comprises: a means for receiving a request to generate a first configuration file, wherein the first configuration file is associated with a plurality of isolated guests; a means for launching a first short-lived guest of the plurality of isolated guests with a first image file on a first memory on a host node; a means for executing a configuration management application on the first short-lived guest, wherein the configuration management application generates and saves the first configuration file to a second memory; a means for terminating the first short-lived guest responsive to the configuration management application saving the first configuration file to the second memory, a means for launching a first service guest of the plurality of isolated guests with a second image file on the first memory on the host node; a means for executing a first service configured with the first configuration file on the first service guest; a means for launching a second service guest of the plurality of isolated guests with the second image file on the first memory on the host node; and a means for executing a second service configured with the first configuration file on the second service guest.

Aspects of the subject matter described herein may be useful alone or in combination with one or more other aspects described herein. In a 22$^{nd}$ exemplary aspect of the present disclosure, a system of accessing network accessible configuration files comprises: a first image file and a second image file stored on a first memory; a second memory associated with a first host node; a configuration store hosted on a third memory across a network from the second memory; and one or more processors executing to: populate the configuration store with a first configuration file, wherein the first configuration file is generated by a first short-lived guest launched from the first image file on the first host node executing a configuration management application; terminate the first short-lived guest after the first configuration file is generated; launch a first service guest with the second image file on the first host node; execute a first service configured with the first configuration file on the first service guest, wherein the first configuration file is retrieved by the first service guest from the configuration store; launch a second service guest with the second image file on the first host node; and execute a second service configured with the first configuration file on the second service guest, wherein the first configuration file is retrieved by the second service guest from the configuration store.

In accordance with a 23rd exemplary aspect of the present disclosure, which may be used in combination with any one or more of the preceding aspects (e.g., the 22nd aspect), wherein the first image file is the same as the second image file, the first image file includes the configuration management application and an executable code, and the first service and the second service are launched from the executable code. In accordance with a 24th exemplary aspect of the present disclosure, which may be used in combination with any one or more of the preceding aspects (e.g., the 23rd aspect), wherein the configuration management application is disabled in the first service guest and the second service guest, and the executable code is disabled in the first short-lived guest. In accordance with a 25th exemplary aspect of the present disclosure, which may be used in combination with any one or more of the preceding aspects (e.g., the 22nd aspect), wherein a second short-lived guest is launched on the first host node, the second short-lived guest saves a second configuration file to the configuration store, and the first service is re-configured with the second configuration file.

Aspects of the subject matter described herein may be useful alone or in combination with one or more other aspects described herein. In a 25th exemplary aspect of the present disclosure, a method of accessing network accessible configuration files comprises: populating a configuration store with a first configuration file, wherein the configuration store is hosted across a network from a first host node, and the first configuration file is generated by a first short-lived guest launched from a first image file on the first host node executing a configuration management application; terminating the first short-lived guest after the first configuration file is generated; launching a first service guest with a second image file on the first host node; executing a first service configured with the first configuration file on the first service guest, wherein the first configuration file is retrieved by the first service guest from the configuration store; launching a second service guest with a second image file on the first host node; and executing a second service configured with the first configuration file on the second service guest, wherein the first configuration file is retrieved by the second service guest from the configuration store.

Aspects of the subject matter described herein may be useful alone or in combination with one or more other aspects described herein. In a 27th exemplary aspect of the present disclosure, a system of orchestrating containerized deployment of services with host specific configurations comprises: a first image file and a second image file; a first host node and a second host node, wherein a first service guest instantiated with the first image file executes a service on the first host node and a second service guest instantiated with the first image file executes the service on the first host node; and an orchestrator including: a scheduler module; and a configuration module, the orchestrator executing on one or more processors to: receive, by the scheduler module, a request to instantiate a third service guest with the first image file; determine, by the scheduler module, that the first host node lacks capacity to instantiate the third service guest; responsive to determining that the first host node lacks capacity, determine, by the configuration module, that a configuration store associated with the second host node lacks a first configuration file associated with the service; request, by the configuration module, the scheduler module to instantiate a first short-lived guest on the second host node with the second image file; request, by the configuration module, a configuration management application executing on the first short-lived guest to populate the configuration store with the first configuration file, wherein the first short-lived guest self-terminates after generating the first configuration file; instantiate a third service guest with the first image file on the second host node; and execute the service configured with the first configuration file from the configuration store on the third service guest.

In accordance with a 28th exemplary aspect of the present disclosure, which may be used in combination with any one or more of the preceding aspects (e.g., the 27th aspect), wherein the first image file is the same as the second image file, the first image file includes the configuration management application and an executable code, and the service is launched from the executable code. In accordance with a 29th exemplary aspect of the present disclosure, which may be used in combination with any one or more of the preceding aspects (e.g., the 27th aspect), wherein the configuration management application is disabled in the first service guest and the second service guest, and the executable code is disabled in the first short-lived guest. In accordance with a 30th exemplary aspect of the present disclosure, which may be used in combination with any one or more of the preceding aspects (e.g., the 27th aspect), wherein a second short-lived guest is launched on the second host node, the second short-lived guest saves a second configuration file to the configuration store, and the service executing on the third service guest is re-configured with the second configuration file. In accordance with a 31st exemplary aspect of the present disclosure, which may be used in combination with any one or more of the preceding aspects (e.g., the 27th aspect), wherein the service executing on the first service guest and the service executing on the second service guest are configured with a second configuration file in the configuration store. In accordance with a 32nd exemplary aspect of the present disclosure, which may be used in combination with any one or more of the preceding aspects (e.g., the 27th aspect), wherein the configuration store is across a network from the first host node and the second host node.

Aspects of the subject matter described herein may be useful alone or in combination with one or more other aspects described herein. In a 33rd exemplary aspect of the present disclosure, a method of orchestrating containerized deployment of services with host specific configurations comprises: receiving a request to instantiate a first service guest with a first image file; determining that a first host node lacks capacity to instantiate the first service guest, wherein the a first service guest instantiated with the first image file executes a service on the first host node and a second service guest instantiated with the first image file executes the service on the first host node; responsive to determining that the first host node lacks capacity, determining that a configuration store associated with the second host node lacks a first configuration file associated with the service; requesting to instantiate a first short-lived guest on the second host node with the second image file; requesting a configuration management application executing on the first short-lived guest to populate the configuration store with the first configuration file, wherein the first short-lived guest self-terminates after generating the first configuration file; instantiating a third service guest with the first image file on the second host node; and executing the service configured with the first configuration file from the configuration store on the third service guest.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising: a first image file and a second image file stored on a first memory;
a second memory and a third memory associated with a first host node; and
one or more processors executing to:
receive a request to generate a first configuration file, wherein the first configuration file is associated with a plurality of isolated guests, wherein each of the plurality of isolated guests is one of a short-lived guest and a service guest, wherein each service guest includes a first executable code that is enabled, and each short-lived guest is one of (i) lacking the first executable code and (ii) including the first executable code which is disabled;
launch a first short-lived guest of the plurality of isolated guests with the first image file on the second memory on the first host node;
execute a configuration management application on the first short-lived guest, wherein the configuration management application generates and saves the first configuration file to the third memory;
responsive to saving the first configuration file to the third memory, terminate the first short-lived guest without the short-lived guest ever executing the first executable code;
launch a first service guest of the plurality of isolated guests with the second image file on the second memory on the first host node;
execute a first service configured with the first configuration file on the first service guest;
launch a second service guest of the plurality of isolated guests with the second image file on the second memory on the first host node; and
execute a second service configured with the first configuration file on the second service guest.

2. The system of claim 1, wherein the first image file is the same as the second image file and the first image file includes the configuration management application and the first executable code, and the first service and the second service are launched from the first executable code.

3. The system of claim 2, wherein the first executable code is disabled in the first short-lived guest.

4. The system of claim 2, wherein the configuration management application is disabled in the first service guest and the second service guest.

5. The system of claim 1, wherein the third memory is mounted to the first host node.

6. The system of claim 1, wherein the third memory is mounted to the first short-lived guest, the first service guest, and the second service guest.

7. The system of claim 6, wherein a scheduler is configured to mount the third memory to each isolated guest of the plurality of isolated guests launched on the second memory from the second image file.

8. The system of claim 1, wherein a second short-lived guest is launched on the first host node, the second short-lived guest saves a second configuration file in the third memory, a third service guest is launched with a third service, and the third service is configured with the second configuration file.

9. The system of claim 8, wherein the second configuration file overwrites the first configuration file and the first service is reconfigured with the second configuration file.

10. The system of claim 1, wherein the configuration management application is controlled by a configuration interface.

11. The system of claim 1, wherein the first host node is one of a physical host and a virtual machine.

12. The system of claim 1, wherein the first service is launched as part of a startup sequence of the first service guest.

13. The system of claim 1, wherein the first configuration file includes first host specific settings of the first host node.

14. The system of claim 13, wherein a second configuration file is saved to the third memory by a second short-lived guest on a second host node, the second configuration file including second host specific settings of the second host node, and a third service configured with the second configuration file executes on a third service guest on the second host node.

15. The system of claim 1, wherein the third memory is a configuration storage across a network from the first host node, and the configuration storage is queried by the first service guest to retrieve the first configuration file.

16. A method of generating configuration files, the method comprising: receiving a request to generate a first configuration file, wherein the first configuration file is associated with a plurality of isolated guests wherein each of the plurality of isolated guests is one of a short-lived guest and a service guest, wherein each service guest includes a first executable code that is enabled, and each short-lived guest is one of (i) lacking the first executable code and (ii) including the first executable code which is disabled;
   launching a first short-lived guest of the plurality of isolated guests with a first image file on a first memory on a host node;
   executing a configuration management application on the first short-lived guest, wherein the configuration management application generates and saves the first configuration file to a second memory;
   responsive to saving the first configuration file to the second memory, terminating the first short-lived guest without the short-lived guest ever executing the first executable code;
   launching a first service guest of the plurality of isolated guests with a second image file on the first memory on the host node;
   executing a first service configured with the first configuration file on the first service guest;
   launching a second service guest of the plurality of isolated guests with the second image file on the first memory on the host node; and
   executing a second service configured with the first configuration file on the second service guest.

* * * * *